United States Patent [19]
Ryan et al.

[11] Patent Number: 5,185,925
[45] Date of Patent: Feb. 16, 1993

[54] METHOD OF MANUFACTURING A TUBE FOR A HEAT EXCHANGER

[75] Inventors: Richard P. Ryan, East Amherst; Gary A. Halstead, Lockport; David M. Smith, Amherst, all of N.Y.; Shrikant M. Joshi, Cambridge, Mass.

[73] Assignee: General Motors Corporation, Detroit, Mich.

[21] Appl. No.: 827,679

[22] Filed: Jan. 29, 1992

[51] Int. Cl.⁵ .............................................. B23P 15/26
[52] U.S. Cl. ............................ 29/890.049; 29/890.035
[58] Field of Search .................... 29/890.035, 890.049, 29/890.039, 890.07; 165/157, 173

[56] References Cited

U.S. PATENT DOCUMENTS

| | | | |
|---|---|---|---|
| 4,470,452 | 9/1984 | Rhodes | 165/153 |
| 4,470,455 | 9/1984 | Sacca | 165/167 |
| 4,600,053 | 7/1986 | Patel et al. | 165/170 |
| 4,805,693 | 2/1989 | Flessate | 165/153 |
| 4,932,469 | 6/1990 | Beatenbough | 165/153 |

FOREIGN PATENT DOCUMENTS

| | | | |
|---|---|---|---|
| 0052196 | 3/1984 | Japan | 29/890.049 |
| 0067531 | 4/1986 | Japan | 29/890.049 |
| 0084097 | 3/1989 | Japan | 29/890.053 |

Primary Examiner—Irene Cuda
Attorney, Agent, or Firm—Ronald L. Phillips

[57] ABSTRACT

A condenser having two piece die formed condenser tube parts that are joined along a beveled outer edge. The tube material is braze cladded on both sides for corrosion resistance and for high quality internal braze bonding of (1) longitudinal tube webs for optimizing burst strength, and (2) the tubes to associated air centers which are not cladded for an economical unit. The tubes can be readily made in a multiport or single port design by die forming the longitudinal webs in each tube part, and at discreet lengths along the tube length to provide a cut off area for sizing the tube and a smooth circumferential area where the tube parts with a beveled outer edge enter the header providing a close fit and high quality brazed joints. This tube design provides material and cost advantages over the conventional extruded tubes or roll formed condenser tubes and is readily fabricated using corrosion resistant alloys providing long service life. The number and spacing of the webs in this construction can be readily made by changing the spacing of the dies for forming the tube parts. The method provided by this invention provides increased output with higher machine speeds as compared to extrusion type processes.

2 Claims, 4 Drawing Sheets

METHOD OF MANUFACTURING A TUBE FOR A HEAT EXCHANGER

TECHNICAL FIELD

This invention relates to heat exchangers, and more particularly to a new and improved heat exchanging condenser and condenser tubing for an air conditioning system, and to a new and improved method of making heat exchanger tubing.

BACKGROUND OF THE INVENTION

A condenser for an automotive air conditioner system generally comprises an aluminum tube and air center heat transfer unit that, in automotive installations, is preferably located forward of the engine coolant radiator. The condenser functions to cool the high pressure vapor forced from the compressor so that it condenses into a liquid state when air passes through the air centers of the condenser and around the tubes causing the vaporized refrigerant to condense into a high pressure liquid. The high pressure liquid cycling from the condenser is transmitted to the evaporator through an orifice that reduces the pressure liquid into a low pressure suitable for heat transfer operation when vaporizing and coursing through the thin walled tubes of the evaporator of the system as it cools the passenger compartment of the vehicle.

Prior art are shown in FIGS. 1A and 1B. Condensers such as those having serpentined flow of the refrigerant use tube and air center construction in which tubes and centers are alternately stacked into a core. These tubes, as shown in FIG. 1A, are generally extruded with thick and relatively heavy internal webs to provide high burst strength so that tubes will not rupture and leak from the from the pressure of the refrigerant supplied thereto by the compressor. Such webs also provide additional surface area on the refrigerant side for improving the performance of the condenser. The tube shown in FIG. 1B depicts a traditional fabricated tube with a welded tube construction and an internal turbulator brazed into position. The relative weight of prior art designs is heaver than the weight of the subject invention shown in FIGS. 2 and 4–6, which is a two piece construction in which reinforcing is formed as a convolution in the tube wall. For comparable flow areas, and a weight index of 1 for the prior art tubes, the weight index of the invention is 0.66.

While prior art condensers have performed with good results, new condenser lighter weight constructions are needed to meet higher standards for heavy duty use using alloys which are form cladded to provide improved corrosion resistance, and extended service life, while having high burst strength. Also needed are designs that are lighter in weight and more economical to manufacture, and can be readily tailored into different configurations for varying heat exchanging character. Accordingly, it is also known to form a welded tube which is rolled into an elongated ellipsoidal tube with flattened sides. After the basic tube is made, the sides are further roll formed using sets of adjustable rolls that can be set and spaced a predetermined distance from one another. When roll formed using these rolls, the flattened sides of the tubes have laterally spaced and elongated indentations or webs formed therein. These webs are subsequently internally brazed at their apices, or contact points, during the brazing of the condenser core in a furnace. This braze connection can be made with individual tubes, if desired.

SUMMARY OF THE PRESENT INVENTION

This invention is drawn to a new and improved heat exchanger tube and to a method of making tubing therefor. More particularly, the present invention is drawn to a new and improved condenser and condenser manufacturing method.

This invention employs special condenser tubes that are protected against corrosion by rolling a base metal such as alloyed aluminum with an aluminum-silicon cladding of substantially uniform thickness to form coiled stock. The coiled stock is fed into a high speed press with a progressive die to form two identical tube halves. Tubes are cut to length and further die formed into two identical tube halves each having bent edges by suitable die forming machinery; then the outer one of the two tube parts is still further rolled to coin bevel an outer tube edge thereon. Additionally, the opposite ends of each tube have cut off areas free of webs and including oppositely deformed buttons that are joined at contact surfaces to form tubular supports that prevent collapse of the tube ends when they are braze connected to the end walls of the tanks used in the condenser.

With this invention, the preferred design is to apply cladding to the tube parts rather than on the air centers. Extrusions do not include such cladding and, as a result, the condenser assembly requires cladded air centers that are more expensive than air centers which are not cladded. Accordingly, in a preferred embodiment of the present invention, the air centers are not cladded, and the tubes are cladded on both side with aluminum-silicon that provides the simple eutectic with which aluminum forms with silicon and, as a consequence, good internal and external braze fillets are provided. Rolled form alloys used with this invention, e.g., Kaiser Aluminum Co. 319 Alloy or Reynolds Aluminum Co. MD-267 Alloy, provide excellent corrosion resistance as opposed to extrusion alloys that cannot provide desired corrosion resistant properties. By changing the die spacing, web spacing can be varied to tailor the burst strength, as well as the heat exchanger operation of the heat exchanger of this invention. The ribs can be continuous or interrupted at predetermined points, as desired, to vary the flow through the condenser and tailor the heat exchanger characteristics thereof. The edges of the outer tube part are roll formed into a bevel shape which closely conforms to the outer radius of the edges of the inner tube part to form an uninterrupted elliptical outer surface on the tube end and that is congruent to an elliptical header opening.

The die formed tubes of this invention can be manufactured at a rate much faster than that of an extruded tube or welded and rolled tubes requiring an inserted turbulator. This results in an increased output and reduced cost. Furthermore, the die formed tube of this invention can be fabricated by using corrosion resistant "long life" alloys. Whereas these alloys cannot be extruded, and therefore, cannot be used in the conventional extruded tube design. In extrusions the number of webs in a tube design require new extrusion dies, whereas in this invention web change can be achieved by changing the spacing of a die set insert at the forming operation.

Another feature of the invention, as shown in FIG. 5, is both pieces are identical and when assembled result in a tube.

These and other features objects and advantages of this invention will become more apparent from the following:

DESCRIPTION OF THE PREFERRED EMBODIMENT

Figure 1:
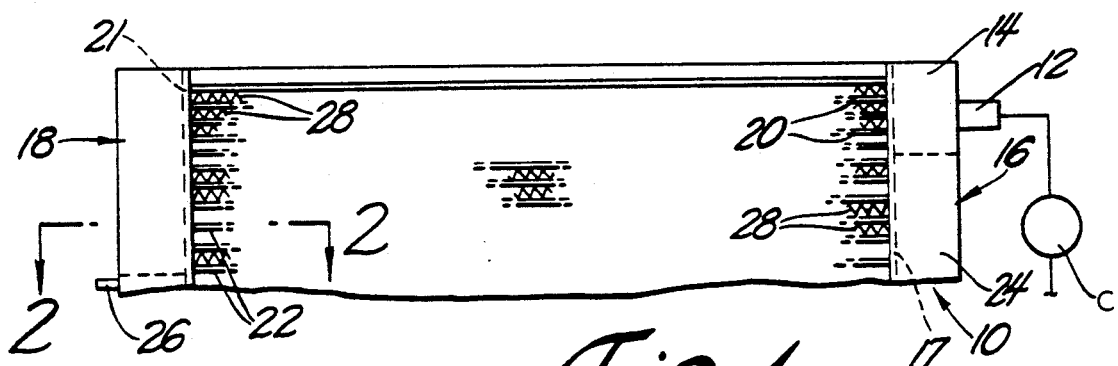
FIG. 1 is a front elevational view of a condenser for an automotive air conditioning system.

Referring in greater detail to the drawings, there is shown in FIG. 1 a condenser 10 of an automotive air conditioning system which is an aluminum tube and air center heat transfer unit located forward of the engine coolant radiator. This condenser cools the refrigerant in the form of high pressure vapor piped thereto from the compressor of the air conditioning system in order that the refrigerant may condense into a liquid so that it can be transmitted in that phase to the evaporator through a pressure reducing orifice in the line between the condenser and the evaporator.

FIG. 1 also shows a condenser inlet pipe 12 leading from the compressor C into the first section 14 of an end tank 16, the header plate 17 of which is operatively connected to an opposite end tank 18 by a first set of parallel spaced and flattened fluid flow tubes 20. Additionally, a second set of parallel spaced tubes 22, which are of the same construction as the tubes 20, connect the header plate 21 of tank 18 to the header plate 17 of a second section 24 of the end tank 16.

High pressure condensed refrigerant is discharged through a pipe 26 for delivery to a condenser through a pressure reducing orifice, which are not shown. Air centers 28 are brazed between tubes 20, 22, as shown.

Figure 4:
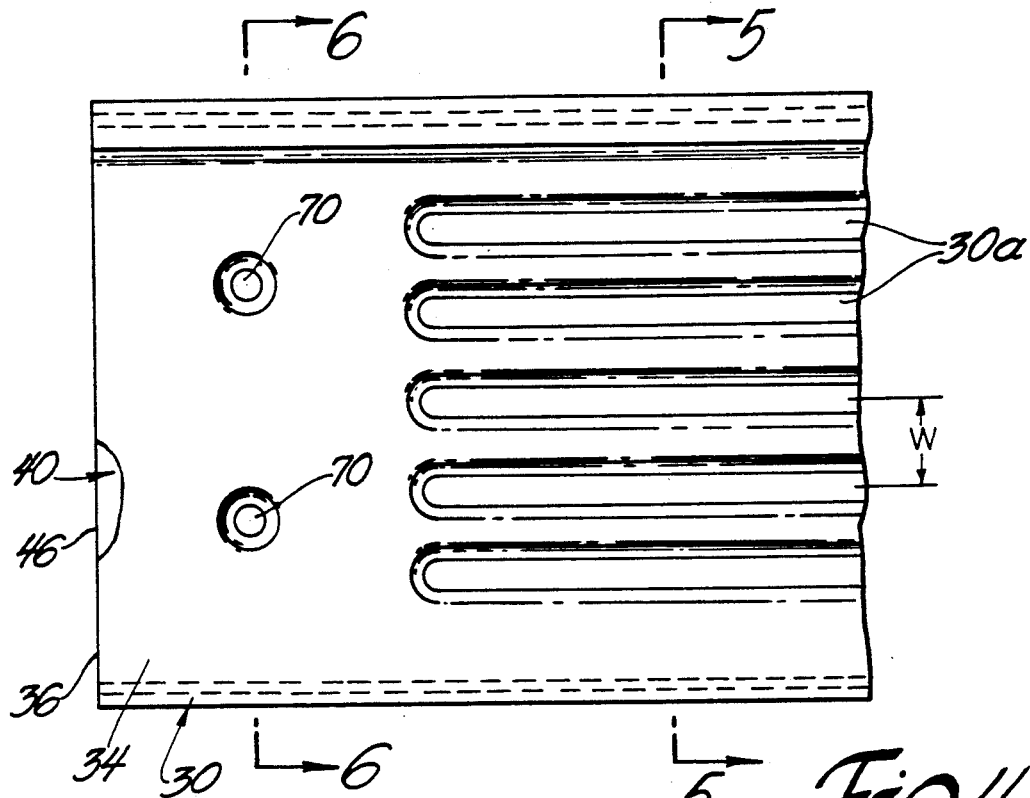
FIG. 4 is an elevational view of one end of one of the tubes provided by this invention having parallel interrupted grooves or webs formed therein extending from a connector section having the tubular supports of the present invention.

In the preferred manufacture, flat blanks are die formed from a base aluminum alloy stock layered on and bonded to both sides with an aluminum-silicon cladding layer of substantially uniform thickness from 5% to 15% of the mean wall thickness of the stock material thickness. The die formed blanks with cladding of equal thickness on both sides, may be cut to length by knives. A first die formed tube part 30 has a plurality of parallel, uniform depressions 30a defining channels or webs 32. These webs are preferably continuous and extend from their starting points spaced a predetermined distance from the leading edge of the die formed tube part 30 to a predetermined stopping point short of the terminal end of the die formed blank. With this construction, smooth and continuous peripheral end areas 34 (one shown in FIG. 4) are provided and ends 36 of the formed tube part 30 (one shown in FIG. 4) can be cut to appropriate length, as desired.

Figure 2:
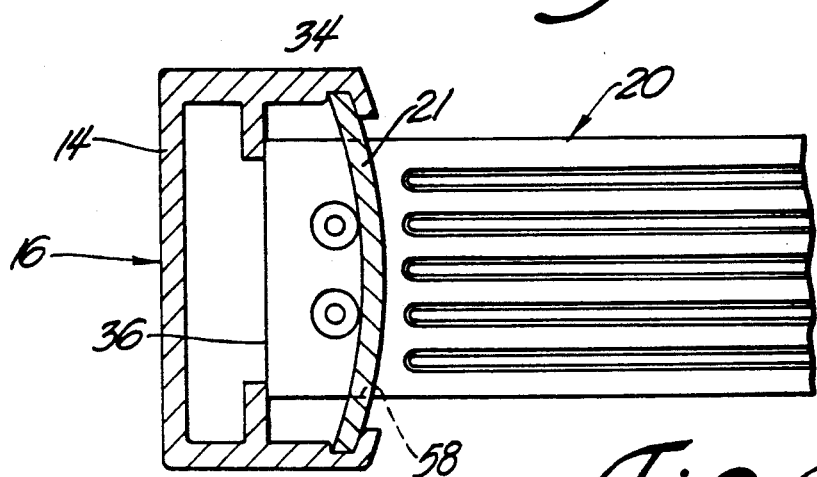
FIG. 2 is an enlarged sectional view taken along line 2—2 of FIG. 1, looking in the direction of the arrows.
Figure 1A:
FIG. 1A is a cross-section of a prior art extruded tube.
Figure 1B:
FIG. 1B is a cross-section of a prior art weld tube with turbulator insert.
Figure 5:
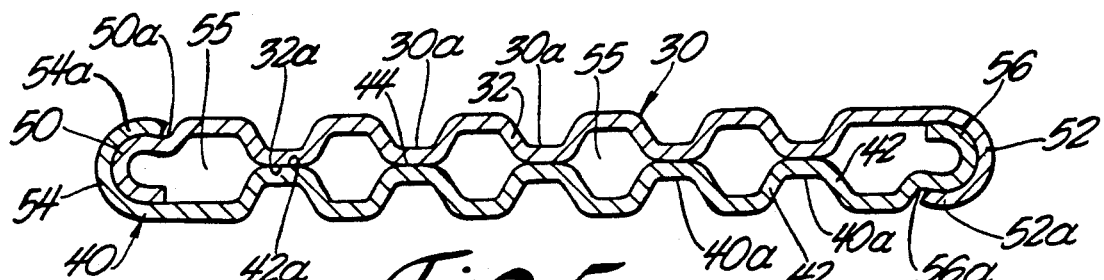
FIG. 5 is a sectional view taken along the line 5—5 of FIG. 4, looking in the direction of the arrows.
Figure 6:
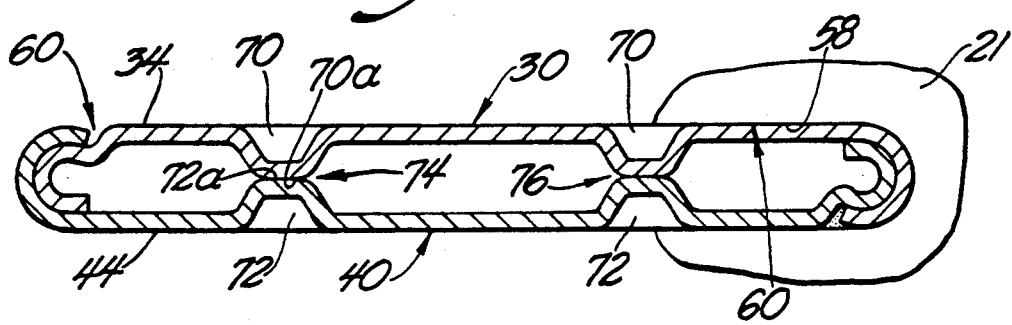
FIG. 6 is a sectional view taken along line 6—6 of FIG. 4, looking in the direction of the arrows and including a fragmentary elevational showing of a header at one side of the sectioned tube.

Likewise, a second die formed tube part 40 is identical to tube part 30 and has a plurality of parallel, uniform depressions 40a, channels or webs 42 that are juxtaposed against webs 32 at interior apices 32a, 42a thereon defining contact regions 44 therebetween. These webs 42 are preferably continuous and extend from their starting points spaced a predetermined distance from the leading edge of the die formed tube part 40 to a predetermined stopping point short of the terminal end of the formed blank. With this construction, smooth and continuous peripheral end areas 44 are provided and opposite ends 46 (one shown in FIG. 4) of the formed blank 40 can be cut to appropriate length, as desired. The continuous smooth peripheral areas 34, 44 are interlocked at bent side edges 50, 52 of tube part 30 and at bent side edges 54, 56 of tube part 40 to form the tubes 20, 22 as unitary parts that can be readily inserted into the closely matching openings 58 of the header plates 17, 21 of the tanks 16, 18, respectively. Specifically, as shown in FIGS. 5 and 6, the side edges 50, 56 are bent inwardly of the tubes 20, 22 and include stepped segments 50a, 56a that receive bent ends 54a, 52a of outwardly located side edges 54, 52 of the tube parts 30, 40. As illustrated best in FIG. 2, this close fit, which is easily made, provides an initially close peripheral connection between the tubes 20, 22 and header plates 17, 21 so that the brazing material is readily sweated into the joint to provide a fluid tight connection. Accordingly, a smooth and continuous annular brazed fluid-tight seal is made when the tubes are assembled into the header plates and suitably clamped and brazed in an oven.

The dies can be positionally adjusted to change the spacing of the webs or increase the number of webs to meet design requirements. The number of ports 55 between the webs 32, 42 can vary from two to ten, depending on the application and the flow area of each of the ports 55 can be varied by changing the width W of each of the webs 32, 42 at their apices 32a, 42a, e.g., increasing the bonded width W will reduce the width of the outer unbonded outer apices 32b, 42b so as to reduce the flow area of each of the ports 55.

In addition to the brazed annular connection to the header plates, the internal walls of each of the webs 32, 42 are firmly brazed along the lengths of the apices at contact regions 44 with brazing material so that the resultant two part tube 20, 22 has an improved burst strength. If desired, the webs of the tubes can be selectively interrupted along their lengths to provide a variation in flow pattern during condenser operation. As in the first embodiment, the tube webs add additional heat transfer surface area for the fluid flowing through the tube, and accordingly, heat transfer performance is improved.

In accordance with another aspect of the present invention, the close fit of the tube ends to the openings 58 of the header plates of the condenser is further assured by directing the joined first and second tube parts 30, 40 through a bevel roller to form the bent ends 52a, 54a of the tube parts 30, 40 forming the outer surface of the tubes 20, 22 where the ends thereof are inserted into the openings 58. As a consequence, there is no gap formed at the ends of the tubes 20, 22 and smooth, continuous surfaces 60 are thereby fully wetted by the cladding of brazing material located both on the outer surface of the tube ends and the inner surfaces of the headers adjacent the openings 58 therein.

Another aspect of the invention is that the tube ends are reinforced by die stamped depressions 70 and 72 formed respectively in the opposite ends of the tube part 30 and the tube part 40. When the tube parts 30, 40 are joined the depressions 70, 72 are mated and brazed together at flat outer surfaces 70a and 72a thereon to form a pair of spaced reinforcing struts 74, 76 at the opposite ends of each of the tubes 20, 22 where they are captured by the header plates. Such reinforcing struts 74, 76 will prevent collapse of the tube ends during the assembly and brazing step so as to assure a fully open flow area at the tube ends for uninterrupted flow of refrigerant between the tanks 16, 18.

Figure 3:
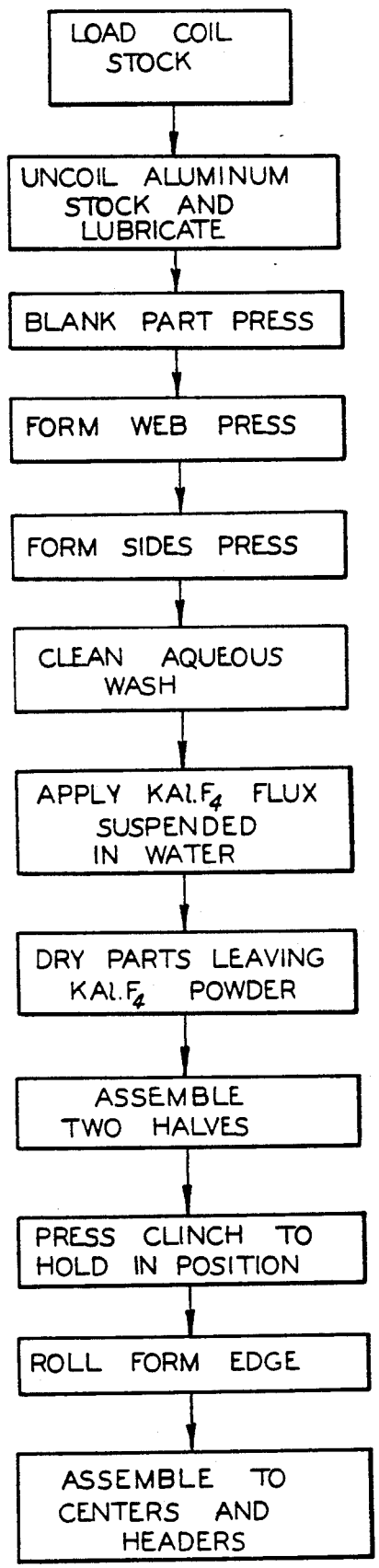
FIG. 3 is a flow chart of a method of the present invention.
Figure 3A:
FIGS. 3A-3F are sectional views showing the fabrication of a tube in accordance with the flow chart of FIG. 3.
Figure 3B:
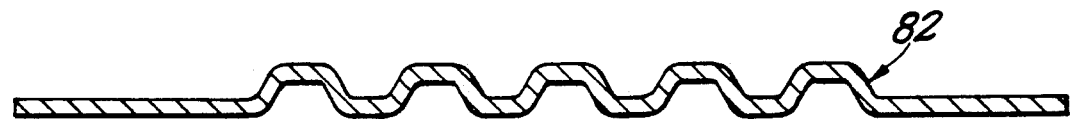
Figure 3C:
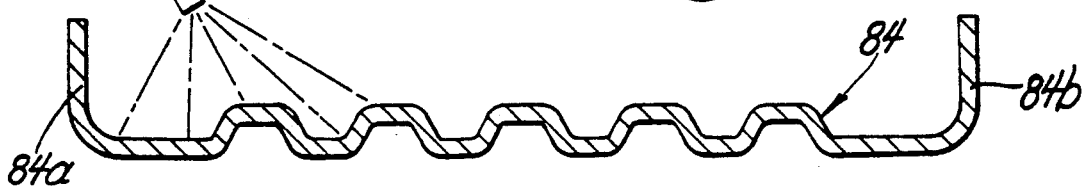

According to the method as shown in FIG. 3, the present invention includes loading coil stock; uncoiling and lubricating the stock; forming a flat blank 80 (FIG. 3A) at a first progressive press station; forming a blank 82 with webs at a second progressive press station (FIG. 3B); forming a blank 84 with sides at a third progressive press station (FIG. 3C); clean and wash the tube parts 30, 40; spray apply 86 KALF$_4$ Tetra-Fluoro-Aluminate flux as wet solution to interior of blank 84 (FIG. 3C); dry parts leaving dry powder KALF$_4$ flux on interior surfaces; assemble identical blanks 84 (FIG. 3D); press clinch 84c to hold in position and to form stepped segments 50a, 56a (FIGS. 3D); roll form edges (FIGS. 3E and 3F) and assembly to centers and headers.

Figure 3D:
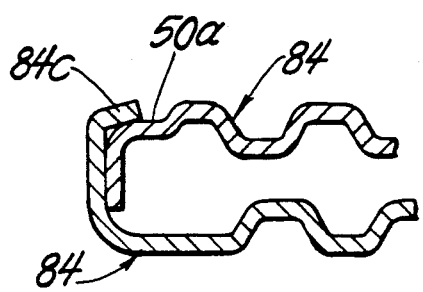
Figure 3E:
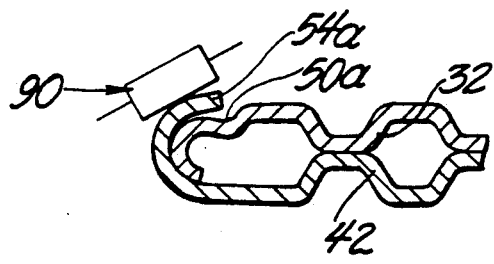
Figure 3F:
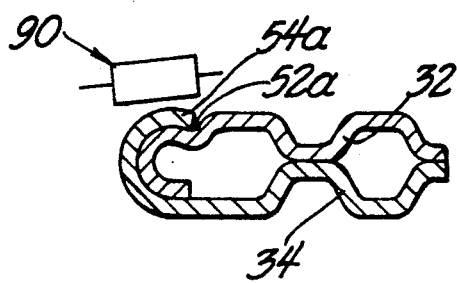

The double clad blanks 84 are die stamped and rolled to form identical tube parts 30, 40 having integral webs 32, 42 and integral depressions 70, 72 therein of the form described above and as shown in FIGS. 4-6 of the drawings. In the first die stamping step shown in FIG. 3A, a flat blank 80 is formed. This blank is then stamped, (FIG. 3B), as blank 84 to form the webs 32, 42. The part then advances through progressive dies to form spaced upright side walls 84a, 84b. Next the side walls 84a, 84b are nested. The first and second tube parts 30, 40 are joined as shown in FIG. 3D and a preclinch is formed at 84c so as to align the webs and form the stepped segments 50a, 56a. Then the tube parts 30, 40 are roll formed by rollers 90 so that the webs 32, 42 are pressed together as shown in FIG. 3E.

The joined tube parts 30, 40 are then directed through spaced rollers 90 which will roll form the outer tube edges 54, 52 into the stepped segments 50a, 56a. The tube can be directed through a pair of flattening rolls if desired to straighten the tube 20 while causing the webs to be tightly engaged and to cause the depressions to be tightly engaged. Thereafter the tube ends are placed in the openings 58 of the headers and the assembly is brazed to join the respective parts into a unitary construction.

With this invention, the air centers 28 do not require cladding as would be the case with conventional units which have extruded drawn tubes that would remove some or all cladding from the tubes being formed. Although this is the preferred method, this invention is not limited to this arrangement. The tube can be either clad or unclad on the exterior surface.

With this invention, other modification can be made employing the principles and teaching of the disclosure herein. It is therefore the intent of this specification to illustrate preferred embodiments of the invention, and the invention to be limited to the scope of the following claims.

What is claimed is:

1. A method of making a tube for a heat exchanger having header plates, comprising the steps of:

providing blanks of aluminum base material, cladding said blanks with a coating of aluminum-silicone cladding material of a substantially constant thickness;

stamp die forming one of said cladded blanks into a first tube part having interior and exterior surfaces with bent elongated side edges and elongated depressions forming spaced webs;

stamp die forming the other of said cladded blanks into a second identical tube part having interior and exterior surfaces with bent elongated side edges and elongated depressions forming spaced webs;

applying flux to said internal surfaces of said first and second tube parts;

interlocking said side bent elongated side edges of said first and second tube parts to form a unitary tube;

beveling said elongated side edges of said first tube part so that it is substantially smoothly fitted throughout its length against the second tube part to define a smoothly, continuously curved surface at each of the ends of the unitary tube;

aligning the webs therein to cause interior apices thereon to be closely adjacent to one another, providing a brazing material to said interior surfaces of said tube parts between adjacent apices of said webs, flattening said tube so that said apices are sufficiently close to one another that the brazing material will be effective to seal said interfacing apices to one another during a subsequent brazing operation, placing said tubes in a furnace and heating said furnace until said interfacing apices are brazed together to form a plurality of separate passages in said tube.

2. The method of making the tube defined in claim 1 above, wherein said die forming of said joined tube parts leaves end portions free of said elongated depressions to enable said tubes to be readily inserted in oval shaped openings in said header plates and readily brazed thereto.

* * * * *